(12) United States Patent
Porzucki et al.

(10) Patent No.: US 6,252,691 B1
(45) Date of Patent: Jun. 26, 2001

(54) INTRASATELLITE WIRELESS COMMUNICATION

(75) Inventors: Joseph Porzucki, Torrance; David W. Lloyd, Manhattan Beach; William R. Procopio, Rancho Palos Verdes; Edward K. Hoffman, Anaheim, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/090,727

(22) Filed: Jun. 4, 1998

(51) Int. Cl.[7] .................................................. H04B 10/00
(52) U.S. Cl. .................. 359/172; 359/154; 359/164; 359/176; 340/10.3; 340/70; 370/277; 370/316
(58) Field of Search .................... 359/172, 164, 359/154, 152, 115, 135, 176; 340/10.3, 70, 870.11, 870.12; 370/277, 316, 336, 338, 343, 345, 532, 537, 538, 540, 465, 466

(56) References Cited

U.S. PATENT DOCUMENTS

| | | | |
|---|---|---|---|
| 5,249,220 | * 9/1993 | Moskowitz et al. | 379/93 |
| 5,383,046 | * 1/1995 | Tomofugi et al. | 359/176 |
| 5,384,652 | * 1/1995 | Allen et al. | 359/172 |
| 5,675,371 | * 10/1997 | Barringer | 348/6 |
| 5,734,487 | * 3/1998 | Rossi | 359/145 |
| 5,963,650 | * 10/1999 | Simionescu et al. | 380/49 |
| 6,057,949 | * 5/2000 | Kinstler | 359/164 |

* cited by examiner

*Primary Examiner*—Leslie Pascal
*Assistant Examiner*—Vu Lieu
(74) *Attorney, Agent, or Firm*—T. Gudmestad

(57) ABSTRACT

A wireless intrasatellite communication system is disclosed. Satellite telemetry signals are multiplexed, converted into a digital data stream, and processed by an ASIC to form a multiplexed telemetry data stream. An infrared transceiver transmits the multiplexed telemetry data stream along an optical path to a designated interface that is associated with a remote command and telemetry unit. Telemetry signals are aggregated within a plurality of remote command and telemetry units and transmitted to a central command and telemetry unit via a high-speed digital bus. Command data issued from the central command and telemetry unit is distributed to a designated remote command and telemetry unit, and is routed to the appropriate user unit via the optical path. The user unit processes the command data and generates a responsive command signal output.

8 Claims, 4 Drawing Sheets

INTRASATELLITE WIRELESS COMMUNICATION

BACKGROUND OF THE INVENTION (a) Field of the Invention

The present invention relates generally to intrasatellite communications. More particularly, it relates to a wireless method of intrasatellite communication that uses infrared transceivers to replace hardwired electrical connections.

(b) Description of Related Art

Conventional satellites are designed to collect, process, and transmit a multitude of digital and analog signals. Typically, hundreds of signals must be coordinated and distributed within the satellite. Conventional intrasatellite signal distribution systems are based on a hierarchical hardwired arrangement of data collection and transmission devices.

A conventional hierarchical satellite signal distribution system 10 is depicted in FIG. 1. Telemetry and command signals are collected from and distributed to a variety of transducers, sensors, and user units 11 that are located within various compartments or sections of the satellite. User units 11 are distinguished from individual (i.e. stand alone) sensors or transducers in that they comprise a more complex functional module within the satellite that typically requires and produces a plurality of telemetry and command signals. Telemetry signals may be bi-level (i.e. 1 bit digital), analog, conditioned analog, and digital words (multi-bit digital). Bi-level signals may, for example, represent the on/off operational status of a sub-system or functional module within the satellite. Analog signals may, for example, be a voltage value that represents the RF power level of a microwave signal in a communication channel, or may alternatively be the filament voltage of a traveling wave tube. Conditioned analog signals may, for example, be a voltage produced across a resistive temperature sensor in response to a precise current source. A multi-bit digital signal may, for example, represent the angular position of the satellite's antenna with respect to the earth.

Telemetry signals within a given compartment or section of the satellite are typically connected via wires to a remote command and telemetry unit (RCTU) 13. Each section or compartment of the satellite may contain one or more RCTUs 13. The RCTUs 13 aggregate and digitize various analog and digital telemetry signals received from the sensors, transducers, and user units 11, and forward them to a central command and telemetry unit (CCTU) 15 along a high speed data bus 14. The CCTU 15 further aggregates the telemetry data received from the RCTUs 13 and produces a multiplexed data stream to be modulated on an RF carrier and transmitted to earth. The CCTU 15 may also forward the multiplexed data stream to an on-board computer system for ground scheduled or other autonomous action by the satellite.

Thus, telemetry signals provide a way for monitoring current satellite conditions remotely from the earth and from on-board the satellite itself. Based on these telemetry signals, the satellite may take autonomous actions and issue command signals to its various user units. Alternatively, satellite actions may be remotely invoked from the earth. In either case, command signals are received by the CCTU, routed via the high-speed data bus to the appropriate RCTU, distributed via wires to the appropriate user unit, and finally processed by the appropriate user unit to execute the desired action. Commanded actions may, for example, include turning on a function, routing a signal to a new destination, or initiating an action in response to an external event.

A single satellite may contain hundreds of user units that each produces and receives a plurality of telemetry and command signals. As a result, in the conventional intrasatellite communications approach hundreds of signal interconnections made between the RCTUs, user units, and stand alone devices are hardwired.

Several disadvantages are inherent in the conventional hardwired approach described above. One disadvantage is that hardwired systems are susceptible to capacitively or inductively coupled electrical transients, and conducted electrical surges and noise. In particular, the increased use of lightweight materials such as Kapton, Teflon, and fused silica to accommodate launch vehicle constraints have increased susceptibility to electrostatic discharge (ESD) events. Satellite appendages such as solar arrays and large diameter antennas can produce ESD events in the kilo-amp range, which can easily damage or destroy sensitive electronics on-board the satellite. Careful design of the satellite's structure and the liberal use of shielding (e.g. Faraday cages) can reduce the potential for damage, but cannot substantially eliminate it.

Another disadvantage of the conventional hardwired approach to intrasatellite communication is that the low cost of wire is more than offset by the higher manufacturing and deployment costs that the mass of wires generates. Hardwiring significantly increases the labor costs associated with producing a satellite because hundreds of electrical/ mechanical wire connections must be made by hand. Furthermore, these hand connections are likely to produce manufacturing defects that result in expensive troubleshooting and rework or that, more significantly, may produce a latent defect that manifests itself after the satellite has been placed into orbit. Additionally, factory testing and debugging of satellite sub-systems is made more difficult by hardwired connections because physical connections must be reliably and repeatedly made between each sub-system and various factory functional test systems. Finally, hardwired systems require a large mass of wires that can increase deployment costs because a more expensive launch vehicle may be required to carry the additional weight.

SUMMARY OF THE INVENTION

In accordance with one aspect of the present invention a multiplexer receives a plurality of satellite telemetry signals and produces a multiplexed signal stream. The multiplexed signal stream passes through an analog to digital signal convertor, and is received by an ASIC as a digital data stream that represents analog and digital information selected from the plurality of telemetry signals. The ASIC processes the digital data stream and couples it to an infrared transceiver. The infrared transceiver transmits (via an infrared emitter) the telemetry data stream along an optical path. A command data stream impinges on an infrared detector within the transceiver and produces a command data stream at the transceiver output. The ASIC receives and process the command data stream to activate a command signal output that initiates some satellite action.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
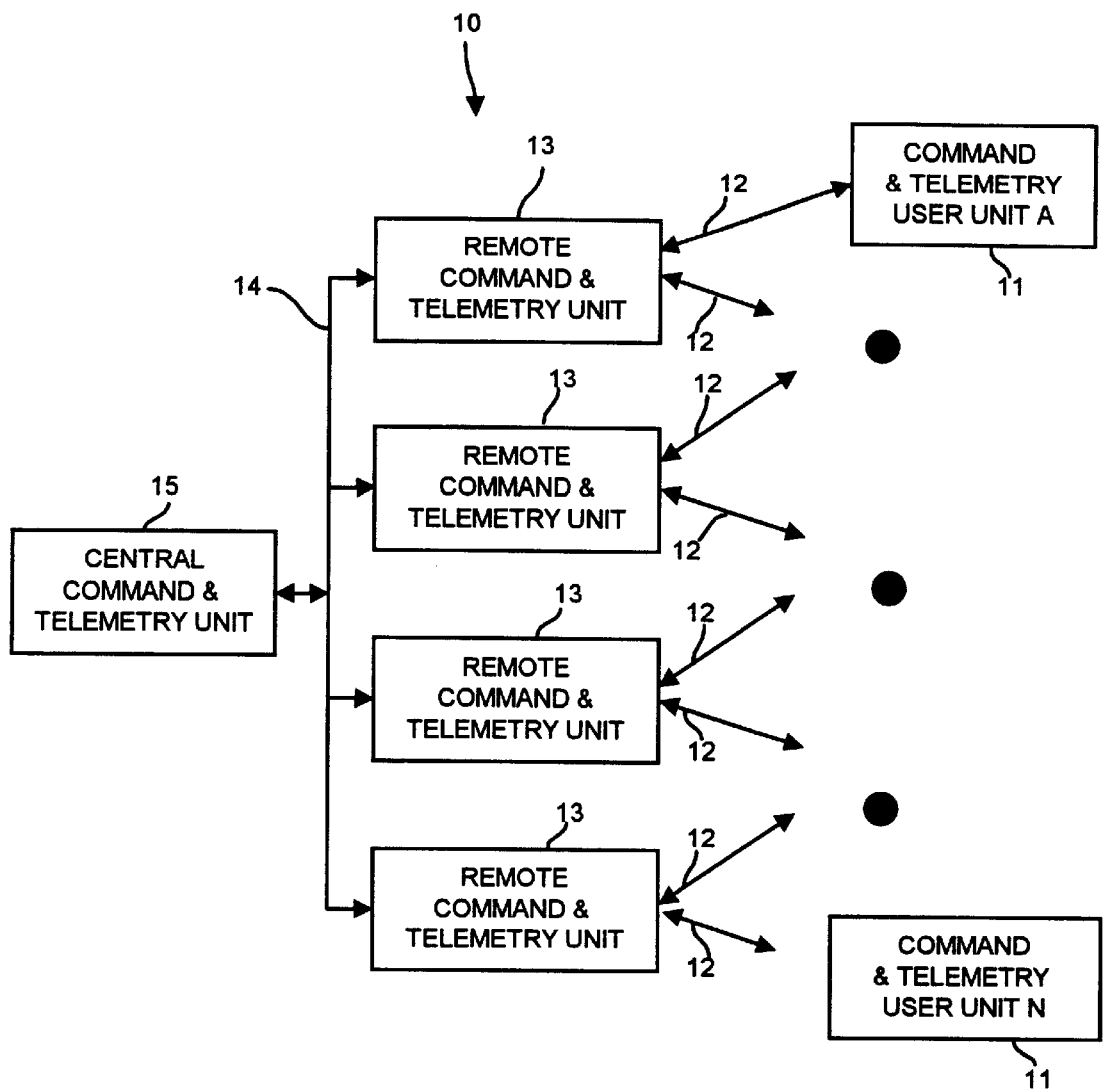
FIG. 1 illustrates a conventional intrasatellite communication system.
Figure 2:
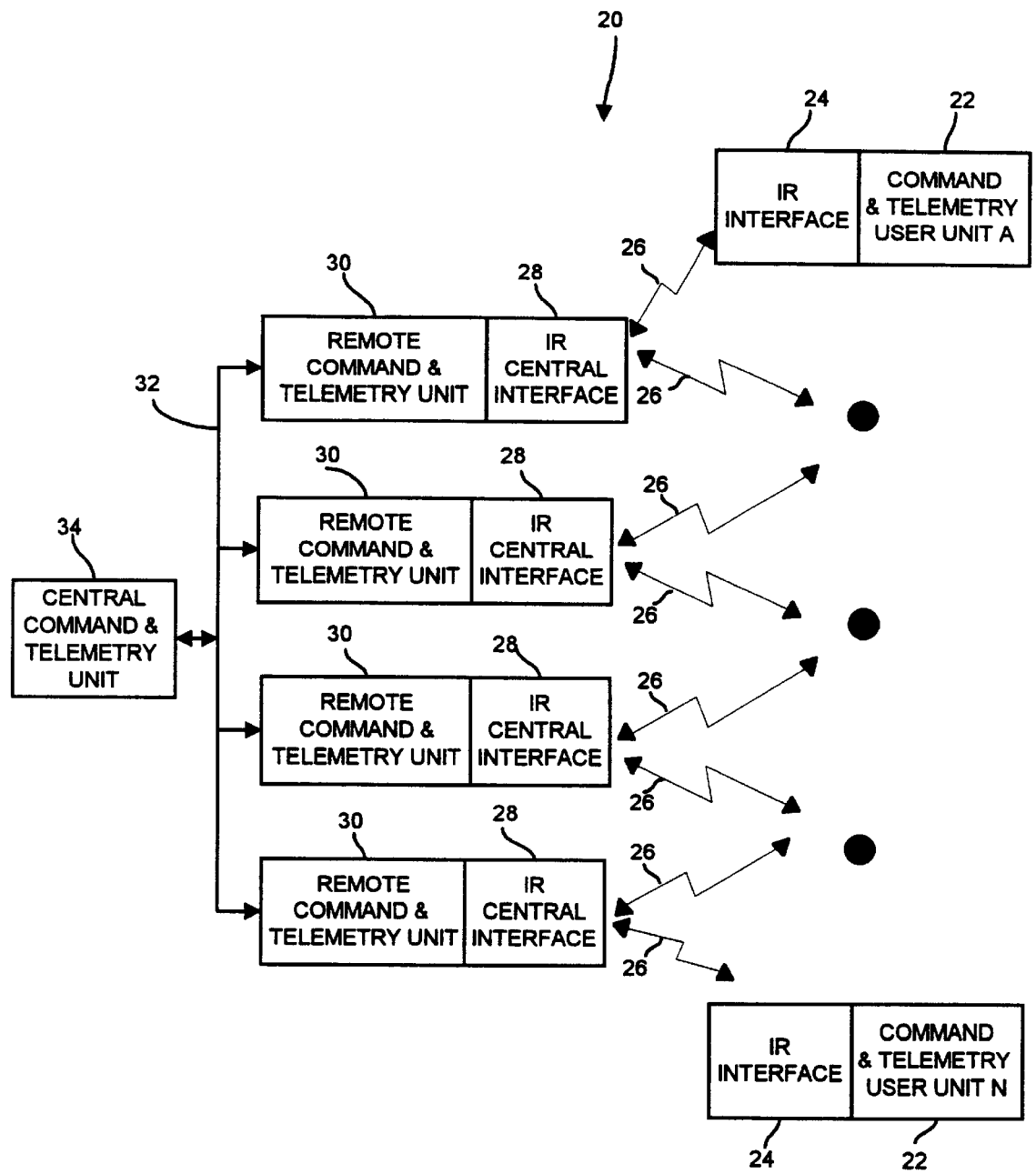
FIG. 2 illustrates a wireless intrasatellite communication system that embodies aspects of the present invention.

The present invention replaces hardwired intrasatellite connections with low cost, lightweight infra-red (IR) based interface modules. Illustrated in FIG. 2 is an intrasatellite communication system 20 that embodies aspects of the present invention. The system 20 comprises a plurality of command and telemetry user units 22, a plurality of IR interfaces 24, a plurality of optical paths 26, a plurality of IR central interfaces 28, a plurality of remote command and telemetry units 30, a high-speed digital data bus 32, and a central command and telemetry unit 34.

The command and telemetry user units 22 produce various analog and digital telemetry signals and execute various command signals in conventional manners previously discussed. The user units 22 are each electronically coupled to corresponding IR interfaces 24.

Figure 3:
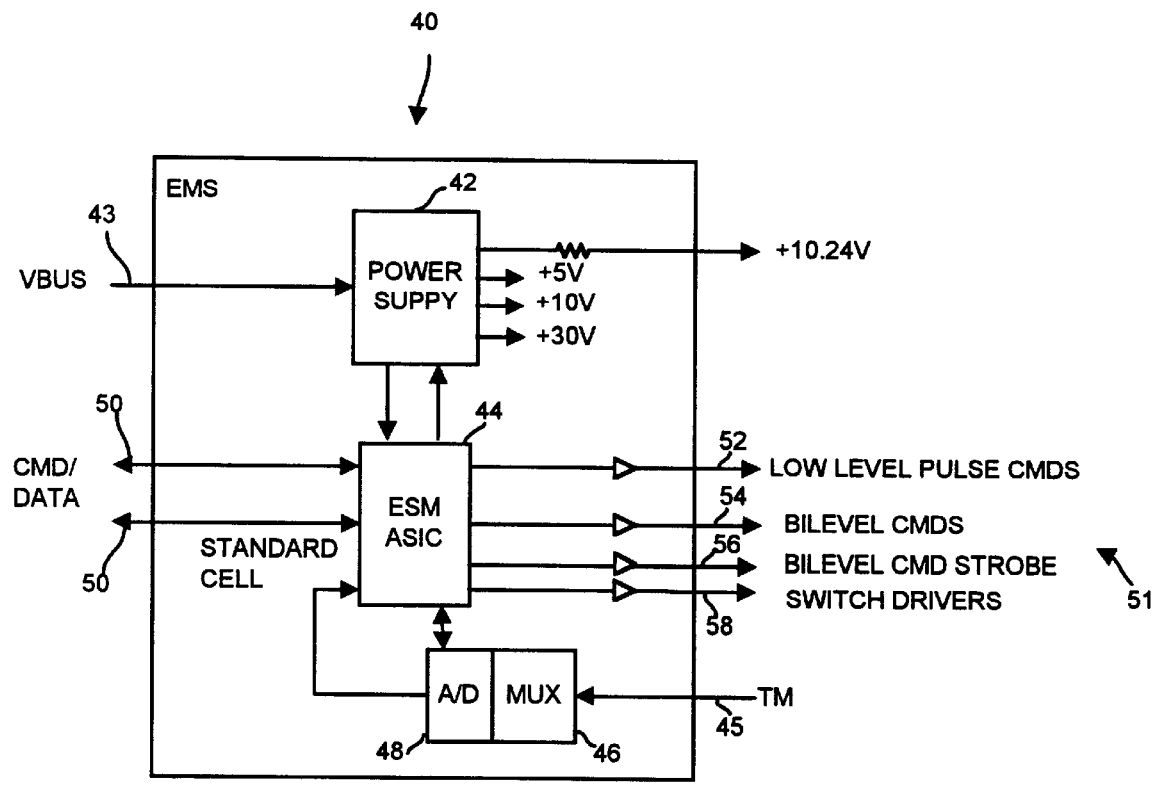
FIG. 3 illustrates by way of example an embedded services module in accordance with the present invention; the embedded service module is part of the IR interface 24 shown in FIG. 2.
Figure 4:
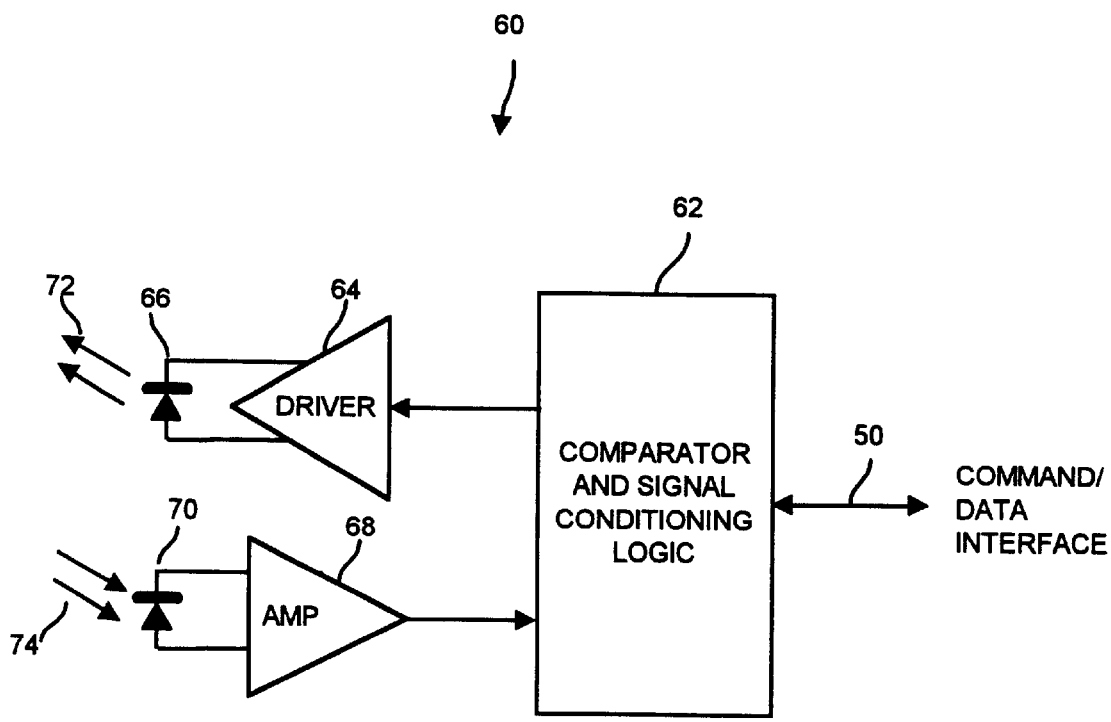
FIG. 4 illustrate by way of example an infra-red transceiver in accordance with the present invention; the infra-red transceiver is also part of the IR interface 24 shown in FIG. 2.

Each IR interface 24, further comprises an embedded services module 40 (shown by example in FIG. 3) and an IR transceiver 60 (shown by example in FIG. 4). The embedded services module (ESM) 40 comprises a power supply 42, an ESM ASIC 44, a telemetry signal multiplexer 46, and an A/D signal convertor 48 all coupled together as shown. The power supply 42 conditions electrical power received from a satellite power bus 43 and provides various supply voltages for internal ESM use, and for use external to the ESM 40. Internal supply voltages may be used to power various circuit components within the ESM 40, and external voltages may be used to supply electrical power to various sensors, transducers, electro mechanical devices, etc. associated with a user unit. For example, the power supply may provide internal voltages of +5 VDC, +10 VDC, and +30 VDC, and an external voltage of +10.24 VDC. The telemetry multiplexer 46 couples a plurality of telemetry signals 45 to the A/D convertor 48 as a multiplexed telemetry signal stream. The ESM ASIC 44 controls the multiplexer 46 and the AID convertor 48 to selectively receive and process digital data representations of the various telemetry signals produced by its associated user unit. The ESM ASIC 44 routes this digital data (representing various telemetry signals) to the command/data lines 50 for subsequent transmission to the remote command and telemetry unit 30 via the IR interface 24, the optical path 26, and the IR central interface 28 (as shown in FIG. 2).

The ESM 40 may also receive command data via the command/data bus 50. The ESM ASIC 44 processes, decodes, and distributes command data to one or more of a plurality of output drivers 51. The ESM may provide, for example, a low-level pulse output 52, a bi-level output 54, a bi-level output strobe 56, a plurality of switch drivers 58, and/or other similar command signals that a user unit may be responsive to. Those skilled in the art will appreciate that the ESM 40 may be easily adapted or modified, without departing from the spirit of the present invention, to provide additional or different output drivers to accommodate the particular interface requirements of a wide variety of possible user units and stand-alone devices found within a typical satellite.

Illustrated in FIG. 4 is an IR transceiver 60 that communicates with the ESM 40 (shown in FIG. 3) via the command/data bus 50. The IR transceiver 60 comprises a comparator and signal conditioning logic (CSCL) sub-section 62, a transmit amplifier 64, a receive amplifier 68, an IR emitter 66, and an IR detector 70. Digital telemetry data received by the CSCL sub-section 62 via the command/data bus 50 is routed to the transmit amplifier 64. The CSCL subsection 62 may include circuitry to improve signal fidelity prior to transmission to minimize erroneous data produced as a result of coupled noise and signal degradation. The transmit amplifier/driver 64 receives a varying voltage waveform representative of the telemetry data and produces a varying or pulsed current through the IR emitter 66 that is representative of the digital telemetry data. The IR emitter 66 thereby produces an IR telemetry wave 72 representative of the digital telemetry data.

Similarly, a command IR wave 74 impinging on the IR detector 70 induces corresponding currents within the detector 70 that are amplified by the receive amplifier 68. The receive amplifier 68 generates a varying or pulsed voltage waveform representative of the command IR wave 74, and couples it to the CSCL sub-section 62. The CSCL sub-section 62 routes the resulting command data to the ESM 40 (shown in FIG. 3) via the command/data bus 50.

Those skilled in the art will recognize that a variety of specific ESM modules may be created to provide an appropriate interface to a particular user unit. Because there are a variety of possible user units, ESMs may be optimized or customized to interface with various types, categories, or groups of user units.

Referring back to FIG. 2, command and telemetry IR waves are communicated from the user units 22, through associated IR interfaces 24, along optical paths 26 as discussed above. Each satellite section or compartment may contain one or more RCTUs 30 that receive and transmit the telemetry and command IR waves from one or more of the user unit/IR interface pairs through the IR central interfaces 28. The IR central interfaces 28 are complementary to the IR interfaces 24. Thus, each IR central interface includes an IR transceiver the same as that shown in FIG. 4, and a processing module that coordinates the collection and further aggregation of multiplexed telemetry data from a plurality of user unit/IR interface pairs.

Each user unit 22 may be assigned a unique address to further facilitate coordination of data collection within the IR central interfaces 28. Preferably, user unit/IR interface pairs each have a unique address are uniquely assigned to communicate with one RCTU. Although a given user unit/IR interface pair only communicates with one RCTU, an individual RCTU typically communicates with multiple user unit/IR interface pairs.

Overall coordination of the communications along the optical paths 26 and the high-speed data bus 32 preferably employs conventional software techniques. For example, the IR central interfaces 28 may use a polling sequence that repetitively and sequentially interrogates the user units assigned to it one address at a time. Alternatively, an interrupt driven protocol may be used so that a given change in status at a user unit results in a request to transmit data to the remote command and telemetry unit. Yet another approach ay use a combination of interrupts and polling such that selected critical telemetry data is continuously polled, and less critical data is communicated using an interrupt protocol. In any case, the coordination of communication along the optical data paths 26 and the high-speed data bus preferably use software methods that are well-known by those having ordinary skill in the art.

In operation, each RCTU 30 aggregates telemetry data received from a plurality of user units and transmits this data to the CCTU 34 via the high-speed data bus 32. The CCTU may modulate this fully aggregated telemetry data on an RF carrier for transmission to earth. The CCTU may also route the fully aggregated telemetry data to a processing unit on-board the satellite.

Conversely, the CCTU 34 routes command data (received from earth or from a processing unit on-board the satellite) along the high-speed data bus 32 to an appropriate RCTU 30. The RCTU then distributes the command data through its associated IR central interface 28, along an optical path 26, to a designated user unit 22. The user unit 22 then executes the command data, which results in an autonomous satellite action.

Those skilled in the art can immediately appreciate that the IR based intrasatellite communication system 20 could potentially replace hundreds of hardwired connections with relatively few IR interface pairs because each optical path carries multiplexed telemetry and command data.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. An apparatus for wireless intrasatellite communication comprising:

a multiplexer adapted to receive a plurality of satellite telemetry signals and compose a multiplexed signal stream from the plurality of telemetry signals;

a signal convertor, coupled to the multiplexer, adapted to convert the multiplexed signal stream into a digital data stream;

an optical transceiver adapted to optically transmit a telemetry data stream, the telemetry data stream including at least some of the digital data stream, and to optically receive a command data stream;

a controller, coupled to the transceiver, the signal convertor, and the multiplexer, the controller being adapted to generate the telemetry data stream by controlling the multiplexer to generate the multiplexed signal stream, the controller further adapted to receive the digital data stream, process the digital data stream, and to couple the digital data stream to the optical transceiver to produce the telemetry data stream, the controller further adapted to receive the command data stream from the optical transceiver, process the command data stream, and to activate a command signal output selected from a plurality of command signal outputs.

2. The apparatus of claim 1, wherein the controller includes an ASIC.

3. The apparatus of claim 1, further comprising a second optical transceiver and second controller, the second optical transceiver in optical communication with the optical transceiver.

4. The apparatus of claim 1, wherein the optical transceiver comprises an infrared emitter and an infrared detector.

5. An apparatus for wireless intrasatellite communication comprising:

a first signal interface adapted to receive a plurality of satellite telemetry signals and being responsive to a multiplexed command data stream;

the first interface comprising a controller means for processing the telemetry signals to form a multiplexed telemetry data stream and to process the command data stream to produce a command signal output;

the first interface further comprising an optical transceiver, adapted to receive the multiplexed telemetry data stream and to optically transmit the multiplexed telemetry data stream along an optical path;

the transceiver further adapted to optically receive the command data stream from the optical path; and a second signal interface adapted to receive the multiplexed telemetry data stream from the optical path, and further adapted to transmit the multiplexed command data stream along the optical path.

6. The apparatus of claim 5, wherein the first signal interface includes an ASIC.

7. The apparatus of claim 5, wherein the second signal interface includes an ASIC.

8. The apparatus of claim 5, wherein the optical transceiver includes an infrared emitter and an infrared detector.

* * * * *